United States Patent [19]
Schmidlin et al.

[11] Patent Number: 5,356,171
[45] Date of Patent: Oct. 18, 1994

[54] COLLAPSIBLE JOGGING INFANT STROLLER

[75] Inventors: Thomas J. Schmidlin; David Eyman, both of Cincinnati, Ohio

[73] Assignee: TRI Industries, Inc., Bloomington, Minn.

[21] Appl. No.: 30,703

[22] Filed: Mar. 12, 1993

[51] Int. Cl.$^5$ .............................................. B62B 7/00
[52] U.S. Cl. ...................................... 280/650; 280/62; 280/47.38; 280/658; 280/642
[58] Field of Search ................ 280/62, 47.38, 30, 47.4, 280/657, 658, 650, 641, 642

[56] References Cited

U.S. PATENT DOCUMENTS

| | | | |
|---|---|---|---|
| D. 204,254 | 5/1966 | Cerf | 280/62 |
| D. 206,116 | 11/1966 | Hughes | 280/62 |
| D. 274,714 | 7/1984 | Cone | 280/600 |
| D. 290,825 | 4/1987 | Mathies et al. | 280/638 |
| D. 297,525 | 9/1988 | Baechler | 280/658 |
| D. 301,850 | 6/1989 | Clement et al. | 280/62 |
| D. 315,885 | 4/1991 | Jacobs | 280/658 |
| 699,186 | 5/1902 | Katzke | 280/30 |
| 716,972 | 12/1902 | Whitmore | 280/657 |
| 2,425,688 | 8/1947 | Schulte | 280/62 |
| 2,455,119 | 11/1948 | Hall | 280/62 |
| 2,781,225 | 2/1957 | Heideman | 280/650 |
| 3,052,480 | 9/1962 | Sanstrom | 280/650 |
| 3,110,504 | 12/1963 | Myers | 280/650 |
| 3,305,244 | 2/1967 | Flagg | 280/650 |
| 3,403,744 | 10/1968 | Dinkel | 280/650 |
| 3,575,461 | 4/1971 | Goldman et al. | 280/650 |
| 3,605,929 | 9/1971 | Rolland | 280/659 |
| 3,656,777 | 4/1972 | Keiser, Jr. | 280/44.4 |
| 3,698,502 | 10/1972 | Patin | 280/47.38 |
| 3,712,636 | 1/1973 | Gesslein | 280/47.38 |
| 3,781,931 | 12/1973 | Patin | 280/30 |
| 3,873,116 | 3/1975 | Perego | 280/30 |
| 3,909,043 | 9/1975 | Black | 280/650 |
| 4,029,329 | 6/1977 | Chambers | 280/650 |
| 4,064,957 | 12/1977 | Parham | 280/27 |
| 4,072,318 | 2/1978 | Laune | 280/650 |
| 4,166,630 | 9/1979 | Sullivan et al. | 280/87.02 |
| 4,181,317 | 1/1980 | Toda | 280/42 |
| 4,325,449 | 4/1982 | D-Addio et al. | 180/217 |
| 4,335,900 | 6/1982 | Fleischer | 280/649 |
| 4,346,912 | 8/1982 | Habib | 280/544 |
| 4,353,567 | 10/1982 | Weldy | 280/92 |
| 4,361,338 | 11/1982 | Kuchenbecker et al. | 280/259 |
| 4,369,987 | 1/1983 | Witherell | 280/644 |
| 4,373,740 | 2/1983 | Hendrix | 180/214 |
| 4,403,673 | 9/1983 | Ball | 180/214 |
| 4,408,776 | 10/1983 | Randolph et al. | 280/62 |
| 4,422,663 | 12/1983 | Hon | 290/278 |
| 4,526,390 | 7/1985 | Slolnik | 280/83 |
| 4,542,915 | 9/1985 | Wheeler, III et al. | 280/30 |

(List continued on next page.)

FOREIGN PATENT DOCUMENTS

| | | |
|---|---|---|
| 213538 | 9/1909 | Fed. Rep. of Germany . |
| 3435575 | 4/1966 | Fed. Rep. of Germany ...... 280/642 |
| 2348716 | 7/1974 | Fed. Rep. of Germany . |
| 2741543 | 6/1978 | Fed. Rep. of Germany . |
| 2579544 | 10/1986 | France . |
| 851163 | 10/1960 | United Kingdom . |
| 2099765A | 12/1982 | United Kingdom . |
| 2204282A | 11/1988 | United Kingdom . |

*Primary Examiner*—Richard M. Camby
*Assistant Examiner*—Christopher P. Ellis
*Attorney, Agent, or Firm*—Palmatier, Sjoquist & Helget

[57] ABSTRACT

A collapsible jogging infant stroller that has a contractible lower frame portion having a rear end supporting two wheels, an intermediate portion and a front fork end supporting a front wheel. A contractible upper frame portion has a lower end pivotally attached to the lower frame portion and an upwardly and rearwardly extending intermediate seat portion supporting a flexible infant seat holder and an upper handle end. A stabilizer strut is connected to the lower frame portion and the upper frame portion to secure the frame portions together for safe and smooth carrying of an infant. A releasable locking means secures the stroller in its upright erect position for use, and when released, permits contraction of the upper and lower frame portions inwardly upon themselves as to move the stroller to a collapsed condition for transportation and storage.

38 Claims, 11 Drawing Sheets

U.S. PATENT DOCUMENTS

| | | | |
|---|---|---|---|
| 4,586,721 | 5/1986 | Harada et al. | 280/30 |
| 4,606,558 | 8/1986 | Core | 280/650 |
| 4,618,184 | 10/1986 | Harvey | 280/62 |
| 4,632,420 | 12/1986 | Miyagi | 280/42 |
| 4,828,278 | 5/1989 | Nakao et al. | 280/47.38 X |
| 4,902,027 | 2/1990 | Skelly | 280/33.998 |
| 4,934,728 | 6/1990 | Chen | 280/650 |
| 4,953,880 | 9/1990 | Sudakoff et al. | 280/658 |
| 4,993,743 | 2/1991 | Takahashi et al. | 280/650 X |
| 5,029,891 | 7/1991 | Jacobs | 280/650 |
| 5,076,599 | 12/1991 | Lockett et al. | 280/658 |
| 5,087,066 | 2/1992 | Mong Hsing | 280/650 X |
| 5,123,670 | 6/1992 | Chiu | 280/62 X |
| 5,205,577 | 4/1993 | Lia | 280/642 |
| 5,207,439 | 5/1993 | Mortenson | 280/641 |

COLLAPSIBLE JOGGING INFANT STROLLER

BACKGROUND OF THE INVENTION

This invention relates generally to wheeled infant strollers or carriers, and more particularly, to a conveniently portable collapsible jogging infant stroller for safely and smoothly carrying an infant which is also uniquely adapted to collapse for storage and transportation into a size less than two of its dimensions when upright and erect for use.

Collapsible or foldable baby carriages for walking have long been known and are generally described in U.S. Pat. Nos. 2,781,225; 3,873,116; and 4,072,318. These early carriages have evolved from more cumbersome, rigid carriages, as many carriages are now collapsible or foldable as to make them conveniently transported or stored.

The problems associated with known collapsible or foldable baby carriages or strollers are well known. For such strollers to be safe and permit smooth carrying of an infant, they must be secured together readily safely, such as with the use of bolts and nuts. Consequently, the disassembly of such strollers is required, necessitating the use of tools to break the stroller partially down to permit collapse or folding. Furthermore, many of these carriages or infant strollers, when in their collapsed or folded state, have one or two of their three dimensions actually extended to a longer length, height or width than when the strollers are erect. This extensibility or expansion of one or two dimensions however has been acceptable as the strollers were at least able to fit into trunks of automobiles and the like which permitted four elongated folded frames.

With the resurgence of physical fitness, persons of all ages, including the parents of infants and young children, have developed great interest in all forms of physical exercise, particularly in jogging and walking at relatively high speeds. Consequently, infant jogging strollers or carriages that fold for transport and/or storage, while yet provide for safe, stable and secure carrying of a child at a relatively higher speed were developed. Several of these infant jogging strollers are shown in U.S. Pat. Nos. Des. 297,525; 4,934,728; 4,953,880; Des. 315,885; and 5,029,891. However, these jogging strollers are also plagued with the problem of frame elongation upon collapse or folding for transportation and/or storage.

There is a continued need for a collapsible or foldable infant jogging stroller which includes all the past known refinements, but further includes the ability to fold or collapse into a contracted condition for transportation and storage wherein two of its three dimensions are less in the collapsed state as opposed to the erect state, while the third dimension remains substantially the same.

SUMMARY OF THE INVENTION

A collapsible jogging infant stroller that has a contractible lower frame portion having a rear end supporting two wheels, an intermediate portion and a front fork end supporting a front wheel. A contractible upper frame portion has a lower end pivotally attached to the lower frame portion and an upwardly and rearwardly extending intermediate seat portion supporting a flexible infant seat holder and an upper handle end. A stabilizer strut is connected to the lower frame portion and the upper frame portion to secure the frame portions together for safe and smooth carrying of an infant. A releasable locking means secures the stroller in its upright erect position for use, and when released, permits contraction of the upper and lower frame portions inwardly upon themselves as to move the stroller to a collapsed condition for transportation and storage.

A principal object and advantage of the present invention is that the jogging infant stroller collapses or folds downwardly and inwardly upon itself to actually shorten its length and height while the width remains the same when the locking means is released and the stroller is moved into its collapsed condition for transportation and storage.

Another object and advantage of the present invention is that the collapsible jogging infant stroller is easily collapsible and erectable without the need for tools.

Another object and advantage of the present invention is that the stroller collapses without the need for disassembly of any part, subpart or component, thereby eliminating the fear of losing any required pieces for the stroller to operate safely and smoothly in its erect condition for use.

Another principal object and advantage of the present invention is that its unique contractible upper and lower frame portions together with two struts comprise the unique collapsible jogging infant stroller that collapsed to a size smaller than its length and height when erect with a minimal number of parts as heretofore not known.

Further objects, features and advantages of the present invention will become understood with reference to the following specification, the appended drawings and the claims.

DETAILED SPECIFICATION

Figure 1:
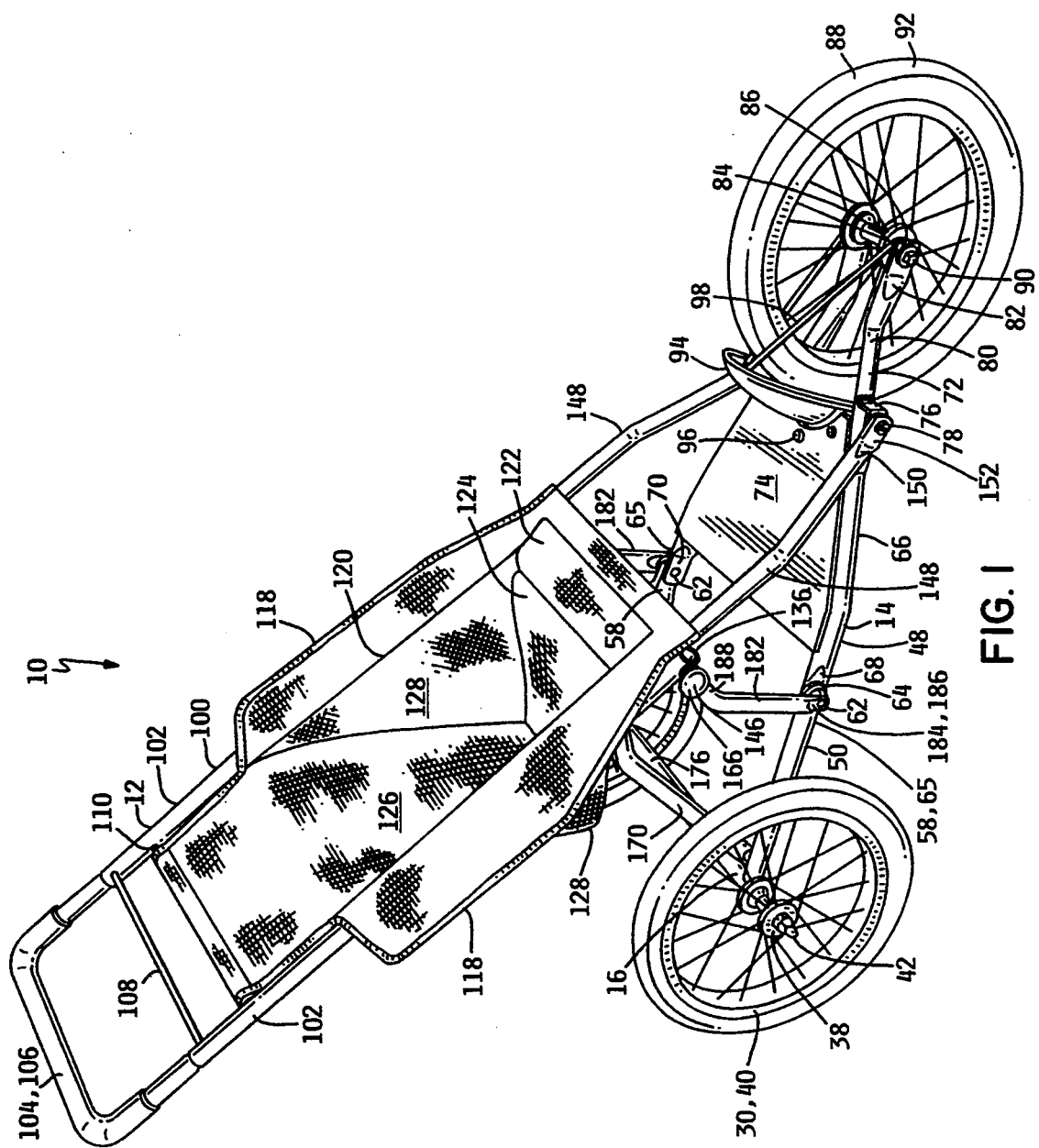
FIG. 1 is a perspective view of the infant stroller in its upright fully assembled erect condition for use.

The collapsible jogging infant stroller 10 in its upright erect condition may generally be seen in FIGS. 1–10. The stroller 10 is comprised of a tubular frame 12 having a lower frame portion 14 supporting rear wheels 40 and front wheel 92 and an upper frame portion 100 supporting a flexible infant holder 122. The lower and upper frame portions 14 and 100 each have intermediate frame portions 65 and 120 whereat the respective lower and upper frame portions 14 and 100 contract and fold upon themselves. Struts 170 and 182 support the stroller 10 in its upright usable condition and assist in simultaneously contracting the lower and upper frame portions 14 and 100 with the release of the locking means 166 and movement of the handle end 104 forwardly.

Specifically referring to FIGS. 1–4, the contractible lower frame portion, which is substantially parallel to the ground G, will be appreciated. The rear end 16 of lower frame portion 14 comprises a cross member 18 which has a hollow interior 20 specifically shown in FIG. 4. A press fit bushing 22 is inserted into interior 20 and has a central threaded aperture 24 therethrough. Bushing 22 also has a shoulder 26 to assure proper and adequate inserting of the bushing 22 into the hollow interior of cross member 18 until the shoulder 26 abuts cross member 18. The outside of bushing 22 has a serrated locknut surface as will be appreciated.

Rear wheel assemblies 30 are each comprised of a threaded shaft 32 with a spacer portion 34 extending from wheel axle and bearing assembly 36 which supports a wheel hub 38 upon which is secured suitably by spokes wheel 40. On the other side of axle bearing assembly 36 on the threaded shaft 32 is located a cap nut 42 for turning threaded shaft 32 into bushing 22 after locknut 44 has been threaded onto shaft 32. By this arrangement, cap nut 42 is rotated clockwise with a wrench until locknut 44 securely abuts and is frictionally held against serrated locknut surface 28 afterwhich the securement of the rear wheel assemblies 30 to the rear end 16 of the lower frame portion 14 is complete.

Extending forwardly from the rear end 16 are contractible converging side rails or legs 48 of the lower frame portion 14 as more clearly shown in FIGS. 1–6. Side rails 48 are comprised of rear links 50 which extend forwardly from their weldment to the rear end 16. Each rear opposing link 50 has a rear end 52, as stated, which appropriately is welded to cross member 18 of rear end 16. Just forward of the rear end 52 is located a pivot pin, rivet, bolt or the like 54 which supports a nylon washer 56 on the inside of link 50. Link 50 also has a forward end 58 which is flattened to form a tongue, tab or ear 60 with an aperture therethrough. Pivot pin, rivet, bolt or the like 54 extends through the aperture of tongue 60 and supports a nylon washer on the outside of the tongue 60. This is considered the intermediate lower frame portion 65.

The contractible lower frame portion 14 also is comprised of opposing forward links 66 each of which have a flattened rear end 68 forming a tongue, tab or ear 70 with an aperture therethrough pivotally captured by pin 62 whereat the rear links 50 and forward links 66 are pivotally joined. Forward links 66 each have converging forward ends 72 and appropriately support a step plate 74 suitably by welding the plate 74's underside to the converging forward links 66. Suitably the step plate has a non-slip surface such as by coating, corrugation or dimpling.

As the forward ends 72 converge, each supports an upper frame pivot mounting bracket 76 with an aperture and pivot pin, rivet or the like 78 therethrough. Front fork ends 80 form a fork 82 whereat the converging forward ends 72 are flattened to form tongues, tabs or ears 84 suitably with slots 86 therein.

The front wheel assembly 88 has a threaded axle bearing and nut arrangement 90 which supports a wheel 92. The front wheel assembly 88 may also be a "drop out axle" as is commonly known as the threaded axle 90 is guided and secured into slots 86 of fork 82. Extending upwardly and forwardly from the step plate 74 is a wraparound fender 94 which is appropriately bolted or screwed perhaps with nuts 96 to the step plate 74. Fender brackets 98 also may support fender 94 as they are secured about threaded axle 90.

Referring to FIGS. 1 and 2, 5 and 6, and 8 through 10, the contractible upper frame portion 100 of the collapsible jogging infant stroller 10 may be appreciated. The upper frame portion 100 is generally of an inverted U-shape. It is comprised of upper links 102 and a U-shaped handle end 104 which appropriately supports a foam rubber-like grip 106. The upper links 102 extend downwardly and forwardly when the stroller 10 is in its upright condition. Awning or canopy support rod 108 is spring loaded and suitably connects the upper links 102. Cross connecting seat bar 110 is appropriately welded between upper links 102.

Figure 7:
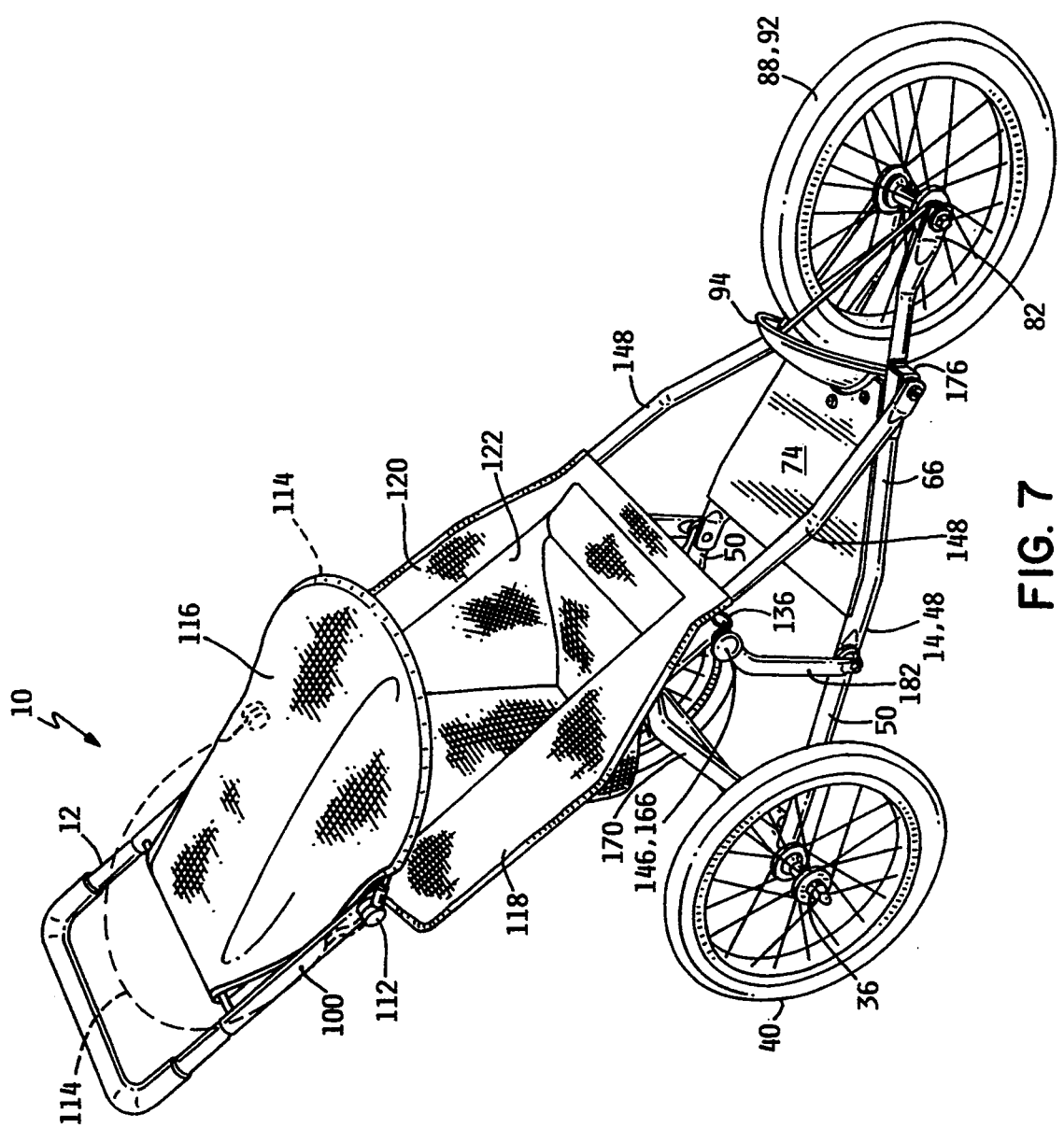
FIG. 7 is a perspective view of the infant stroller in its upright condition similar to FIG. 1 with the addition of the rotatable awning bracket, awning frame and flexible awning or canopy with its folded condition shown in broken outline.
Figure 9:
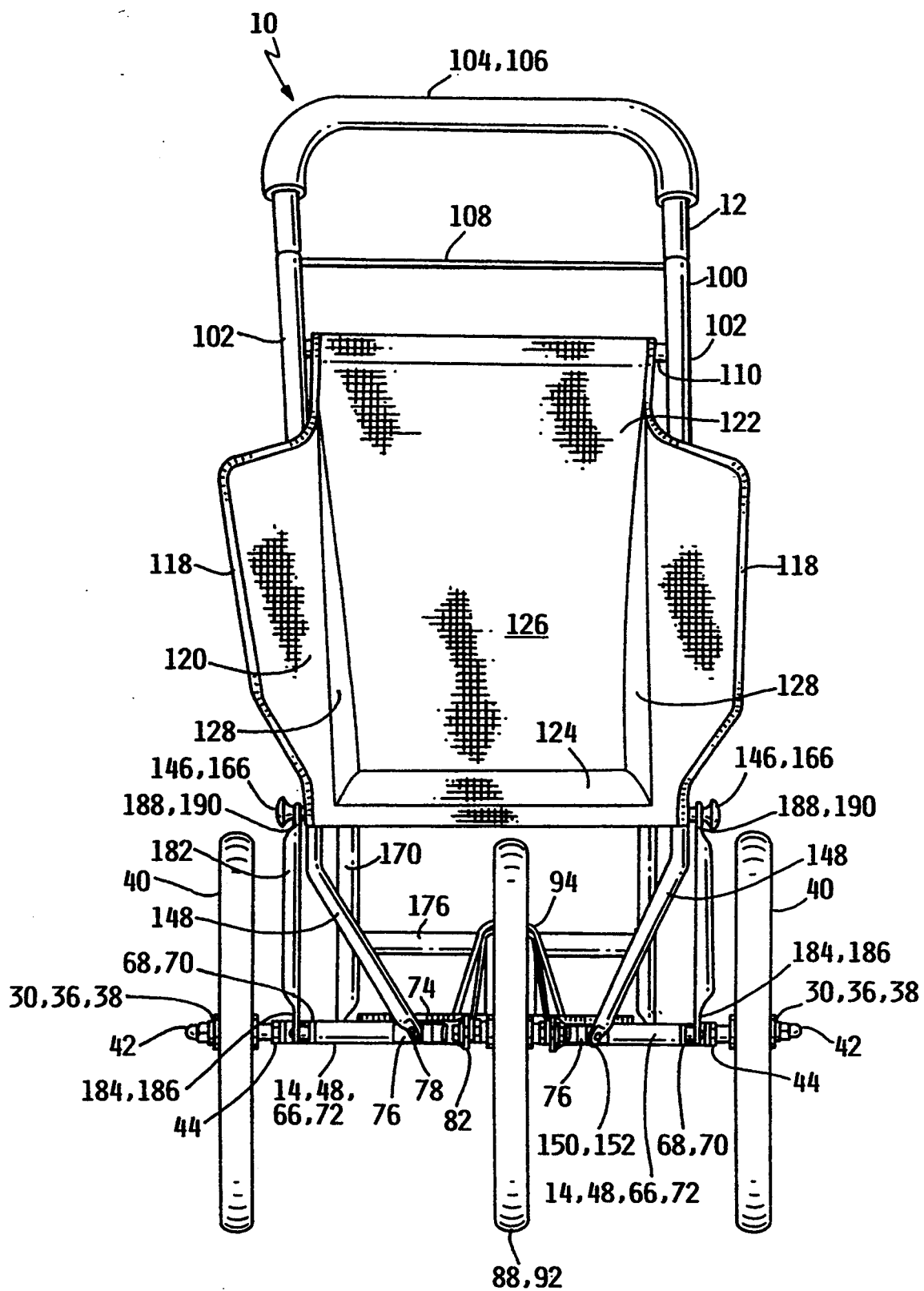
FIG. 9 is a front elevational view of the infant stroller in its upright fully assembled condition for use.
Figure 10:
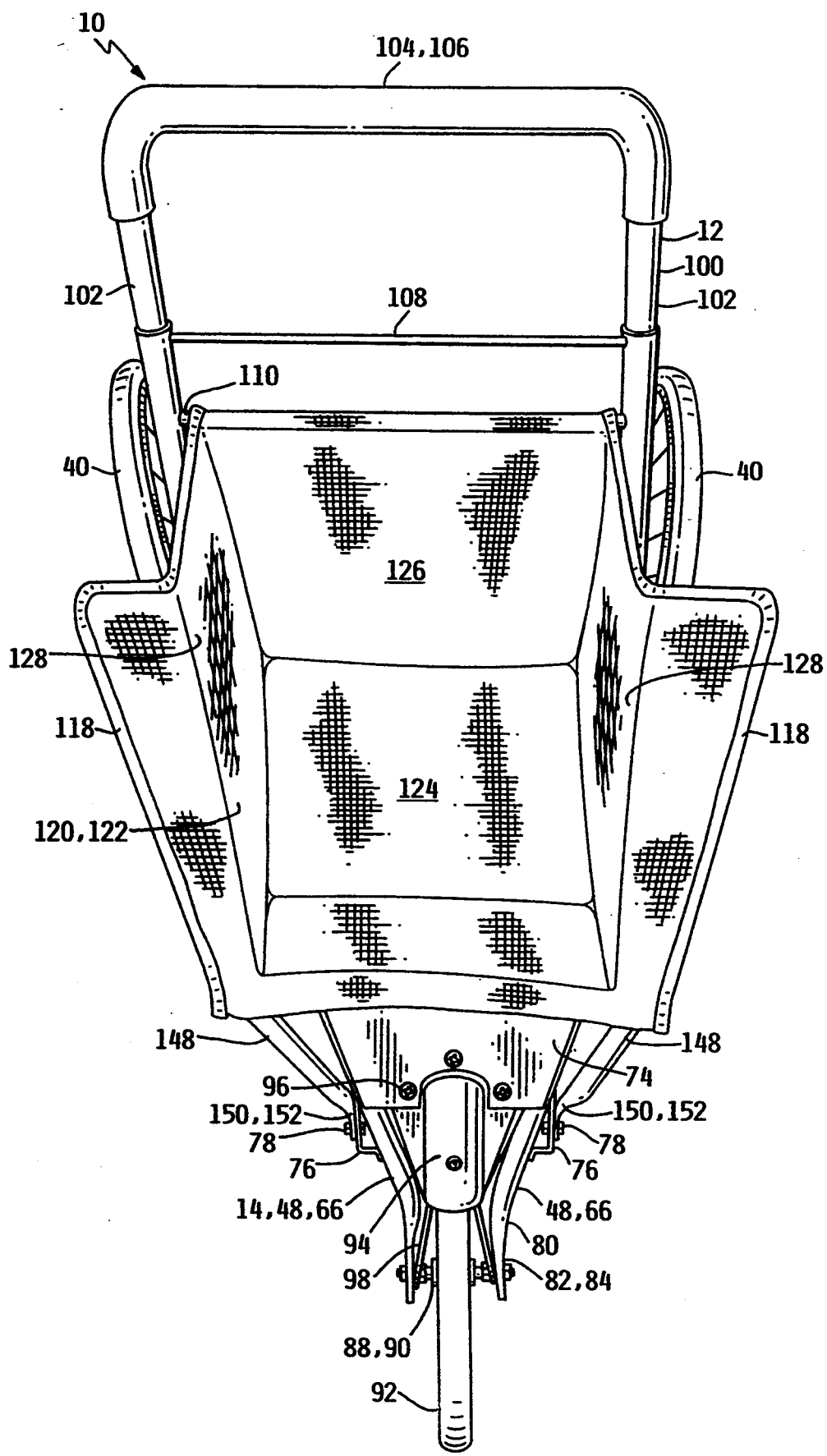
FIG. 10 is a top plan view of the infant stroller in its upright fully assembled condition for use.
Figure 11:
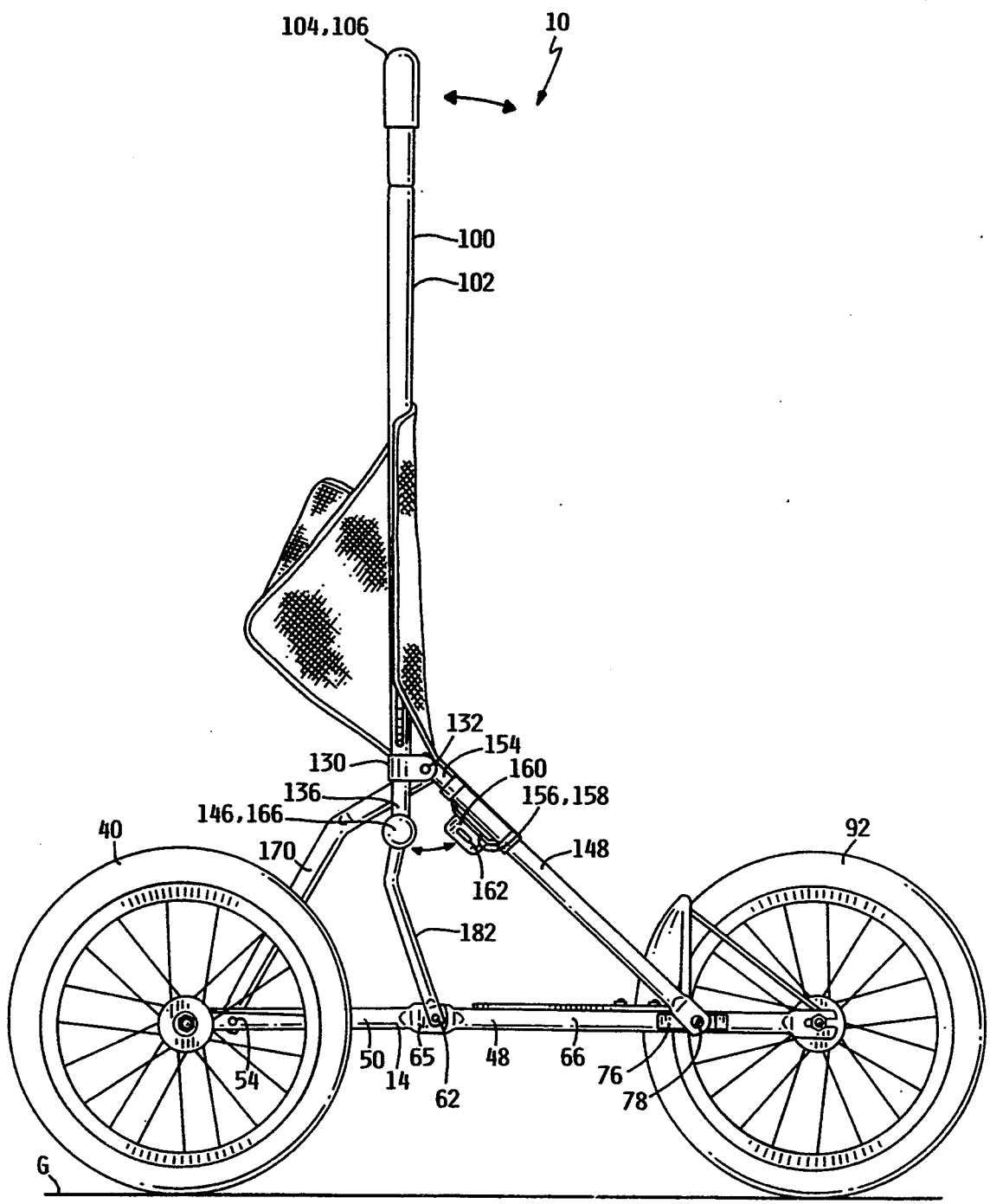
FIG. 11 is a side elevational view of the infant stroller beginning to collapse, or alternatively, approaching its fully upright condition.
Figure 12:
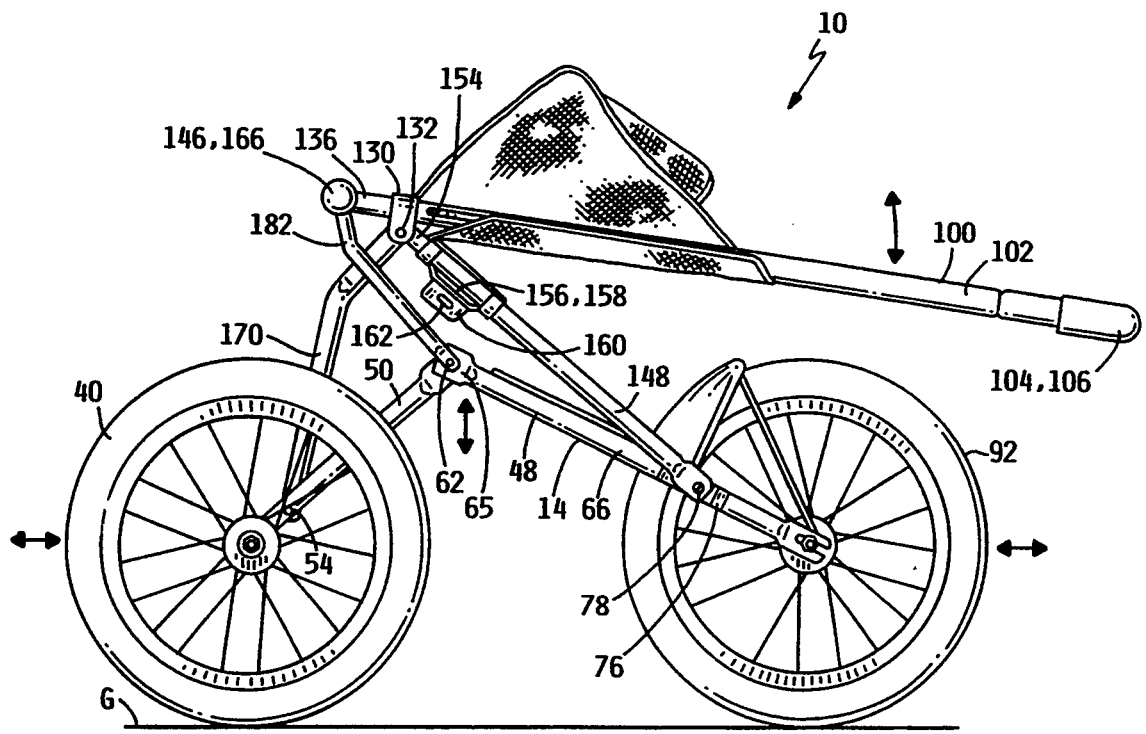
FIG. 12 is a side elevational view of the infant stroller further being moved and contracted to its collapsed condition from FIG. 11, or alternatively being lifted from its fully collapsed condition of FIG. 13 and being moved to its upright fully erect condition of first FIG. 11 and later FIG. 2.

Specifically referring to FIG. 7, a rotatable awning bracket is suitably affixed on the outside of each upper link 102 just below the seat bar 110. The awning bracket is suitably of a ratchet-type from which extends an awning frame 114 which suitably supports a flexible awning 116 or canopy. With the ratchet-type rotatable awning bracket 112 securable in a variety of positions, the awning frame 114 and the flexible awning or canopy 116 may be lowered as to provide overhead protection to the infant or child or be folded back and upwardly to lay along the upper link 102 for easy collapsing or folding of the stroller 10, as will be appreciated.

Wing-like safety fenders or arm rest supports 118 are located generally at the intermediate seat portion 120 of the upper frame portion 100. The wing-like supports 118 and the cross connecting seat bar 110 appropriately permit the draping of the flexible infant holder 122 thereover. Infant holder 122 is appropriately made of a flexible, soft fabric-like seat material. Holder 122 forms a seat 124, backrest 126 and sidewalls 128. Optionally, a seat belt arrangement may be secured in the infant holder 122 as would be appreciated.

Referring to FIGS. 2, 5, 6, 8 and 11 through 13, the releasably locking relationship of the upper links 102 together with the lower converging links 148 may be appreciated. Each upper link 102 appropriately supports a lower link pivot mounting bracket 130 suitably by welding thereat. Bracket 130 has a pivot pin, rivet or the like 132 passing therethrough and supporting a nylon washer 134 on the inward side of bracket 130 as will be appreciated. Just below bracket 130 is located the lower end 136 of upper links 102. The lower end 136 of each upper link 102 has an aperture 138 therethrough wherein a biased lock pin 140 is located and captured thereat by a press fit retaining washer which further secures a spring 144 within the lower end 136. Directed outwardly of the stroller 10 is located a handle 146 grippable by a human hand and extending from the biased locking pin on each side of the stroller 10.

The lower converging links 148 of the upper frame portion 100 may be appreciated by viewing FIGS. 1, 2, 5, 6 and 8. The lower converging links 148 have lower ends 150 which are compressed together thereby forming tongues, tabs or ears 152 with apertures therethrough. The tongues 152 suitably are flush mounted to upper frame pivot mounting bracket 76 and pivot pins or rivets 78 secure the tongues 152 of the lower converging links thereat as they pass through their respective apertures and are secured thereat.

The lower converging links 148 each have an upper end 154 with an upper link support and securing bracket 156 on their lower side. The distal end of the upper end 154 has an aperture therethrough and is suitably captured by the pivot pin or rivet 132 passing through the lower link pivot mounting bracket 130 as to pivotally connect the upper and lower links 102 and 148 of the upper frame portion 100. The underside of the support and securing brackets 156 each suitably have a rest or support surface 158 upon which the lower ends 136 of the upper links 102 securably rest and are aligned thereat by means of alignment tab 160 as the upper frame portion 100 is moved from its contracted condition to its erect condition. A locking aperture or slot 162 is located in alignment tab 160 and suitably receives the biased locking pin 140.

Referring to FIGS. 1 through 6, the operation and benefits of rear strut 70 will be appreciated. Strut 170 has lower ends 172 which are compressed to form tongue, tabs or ears 174 with an aperture therethrough for suitably capturing the tabs 174 with pivot pin or rivet 54 with nylon washer 56 therebetween. Rear strut 170 has a cross member 176 and upper ends 178 which are also suitably flattened to form tongue, tab or ears 180 with apertures therethrough for abutment to the inside of nylon washers 134 and pivotally held thereat by pivot pin or rivet 132.

Referring to FIGS. 1, 2, 5, 6, 8 and 9, the frame stabilizer struts 182 are located on each side of the stroller 10 and extend between the upper frame and lower frame portions 100 and 14. The stabilizer struts each have a lower end 184 which is compressed to form tongue 186 with apertures therethrough for securement of the lower end to pivot pin or rivet 62 as the tongue 186 abuts against the nylon washer 64. The upper end 88 of each stabilizer strut 182 is also compressed to form a tongue 190 with an aperture therethrough for securement to the outside of the lower end 136 of one upper link 102 of the upper frame portion 100 suitably by biased locking pin 140.

Referring specifically to FIGS. 1-2, 8, and 11-13, the releasable locking means 166 between the upper and lower frame portions 100 and 14 will be appreciated. The lower link pivot mounting brackets 130 are each secured to the upper frame portion upper links 102 and pivotally capture the upper ends 154 of the lower converging links 148 together with the upper ends 178 of rear strut 170. The lower end 136 of each upper link 102 appropriately has the biased locking pin 140 extending therethrough with handle 148 fixed to the pin 140 and extending outwardly. As the locking pin 140 is biased to extend through and inwardly of the lower ends 136, the pin 140 is interlockable with the locking slot 162 of the alignment tab 160 extending downwardly from the support and securing bracket 156.

By this arrangement, the biased locking pin 140 releasably secures the upper and lower links 102 and 148 of the upper frame portion 100 securely together with the assistance of brackets 130 and 156. The stabilizer strut 182 extends downwardly from the locking pin 140 and securely holds the rear and forward links 50 and 66 of the lower frame portion 14 substantially parallel to the ground. Further support for the stroller in its upright condition is gained by the pivotally connected rear strut between the upper and lower frame portions 100 and 14.

Figure 2:
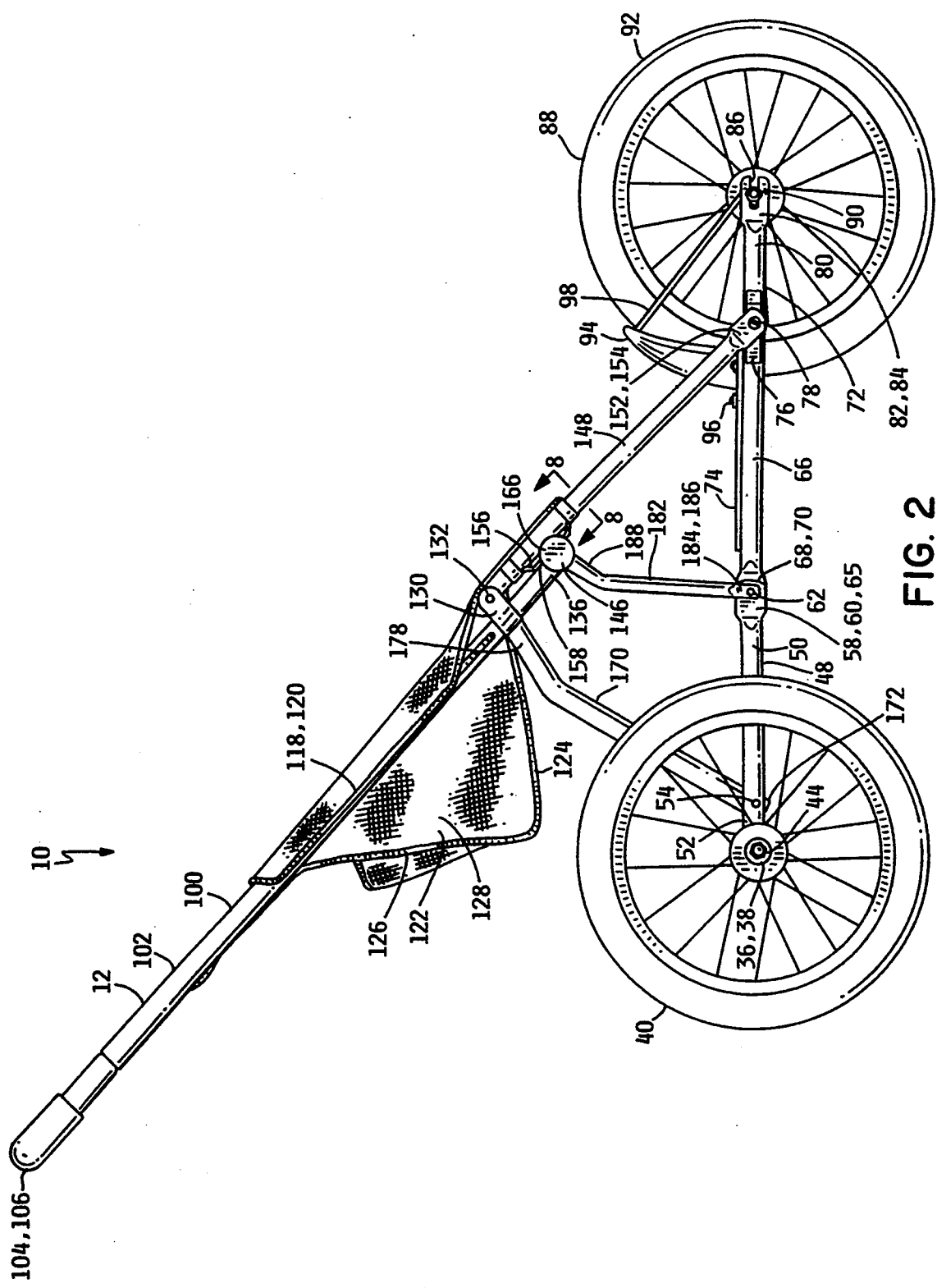
FIG. 2 is a side elevational view of the infant stroller in its upright fully assembled condition for use.
Figure 3:
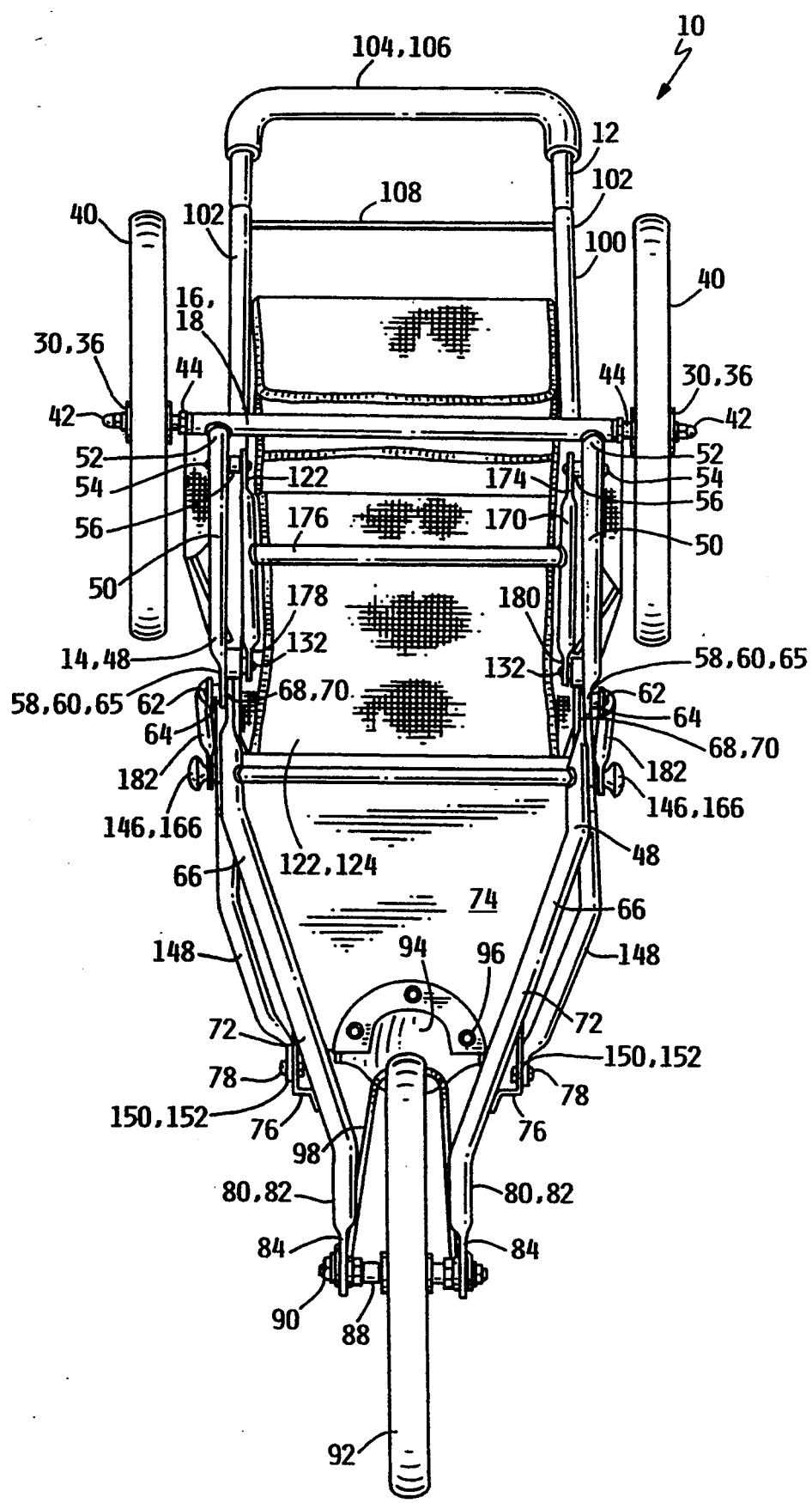
FIG. 3 is a bottom plan view of the infant stroller in its upright condition.
Figure 8:
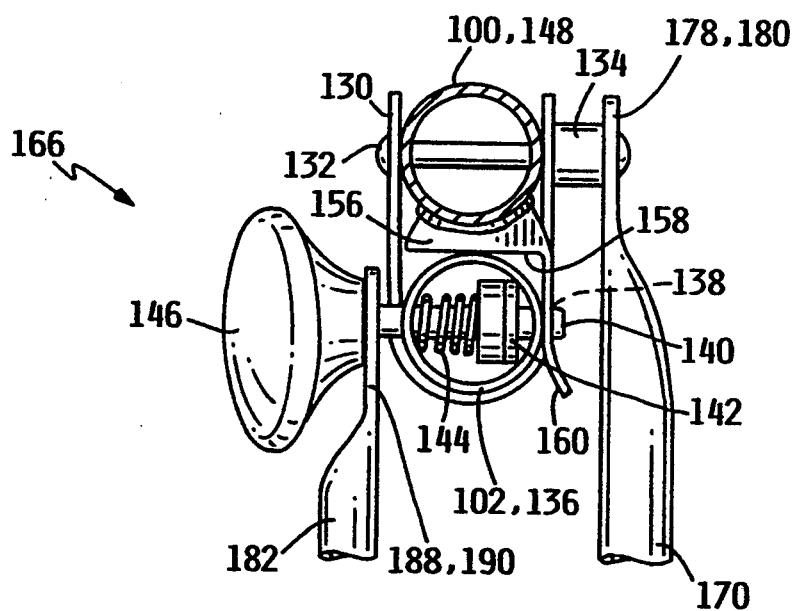
FIG. 8 is an enlarged cross sectional view of the releasable locking means taken along lines 8—8 of FIG. 2.
Figure 4:
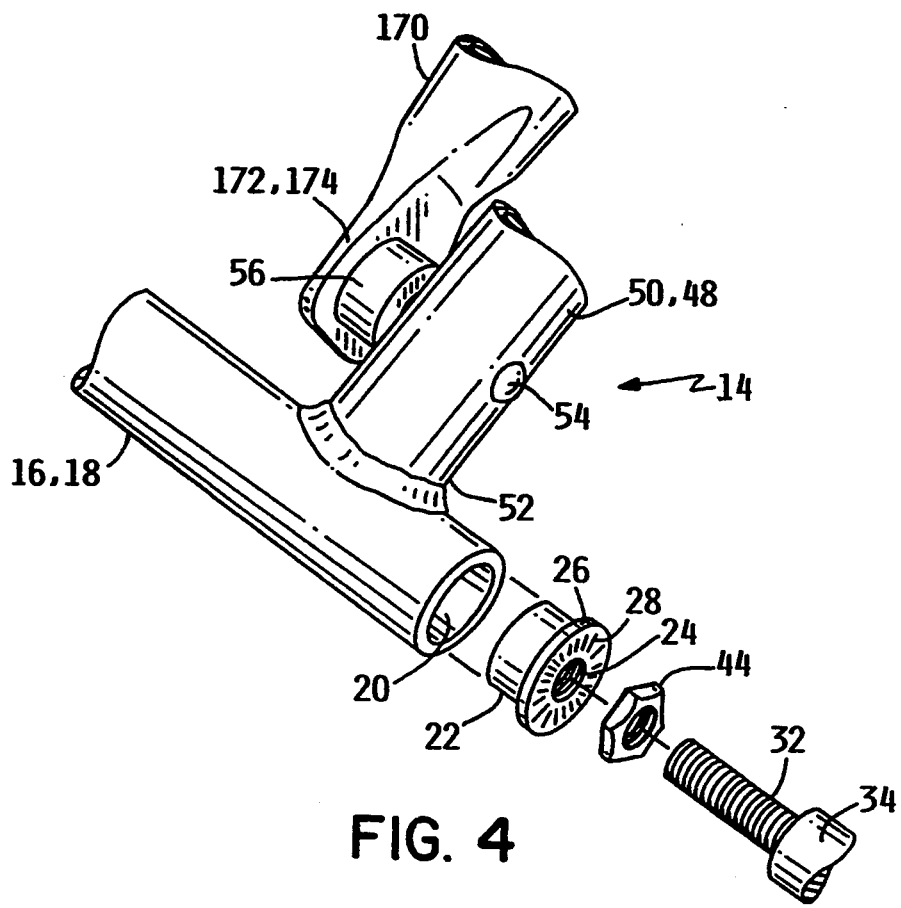
FIG. 4 is an enlarged broken away view of one side of the rear end wherein the other side is its mirror image.
Figure 5:
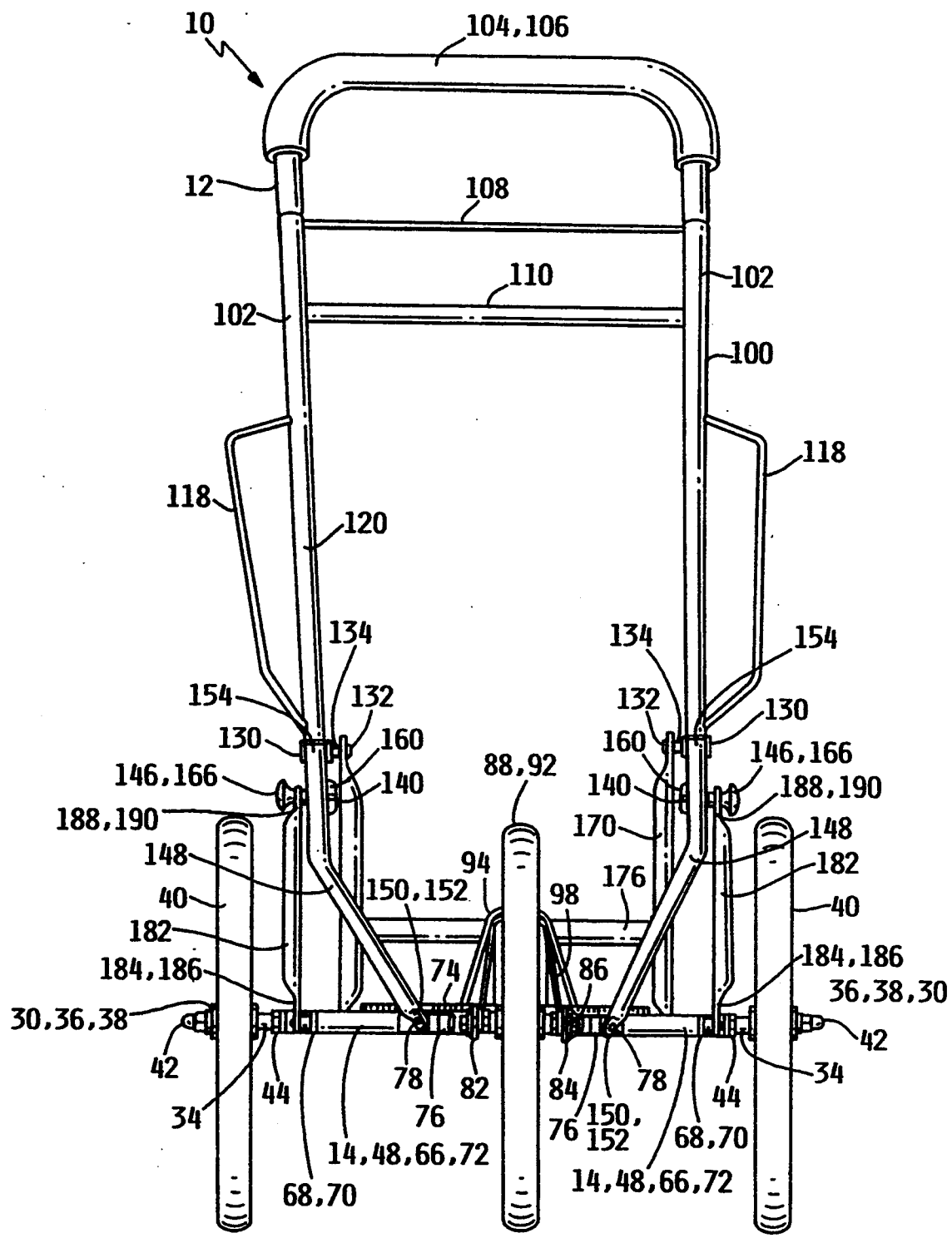
FIG. 5 is a front elevational view of the infant stroller in its upright condition with the flexible infant holder removed for clarity of the stroller's tubular frame.
Figure 6:
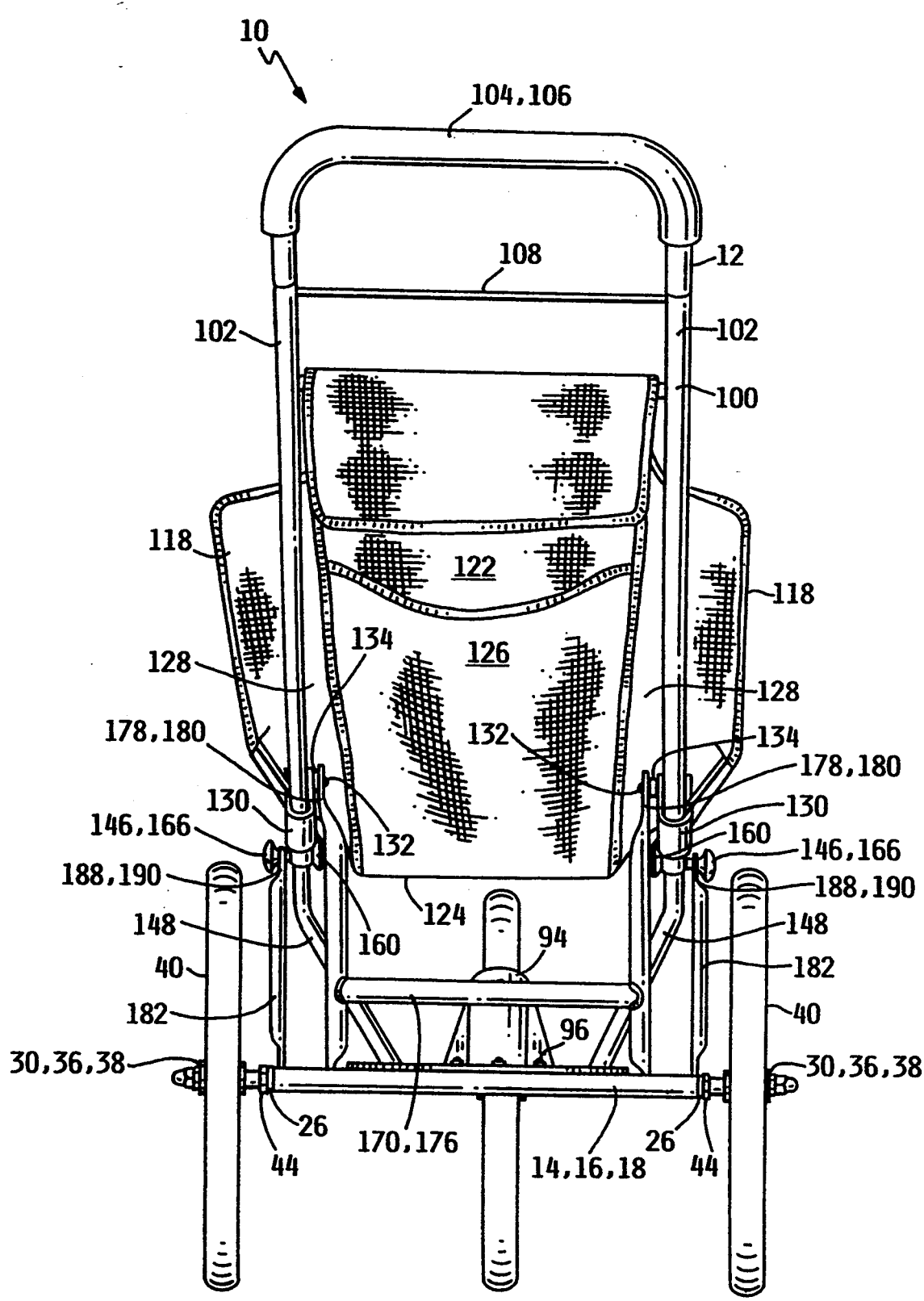
FIG. 6 is a rear elevational view of the infant stroller in its upright condition.
Figure 13:
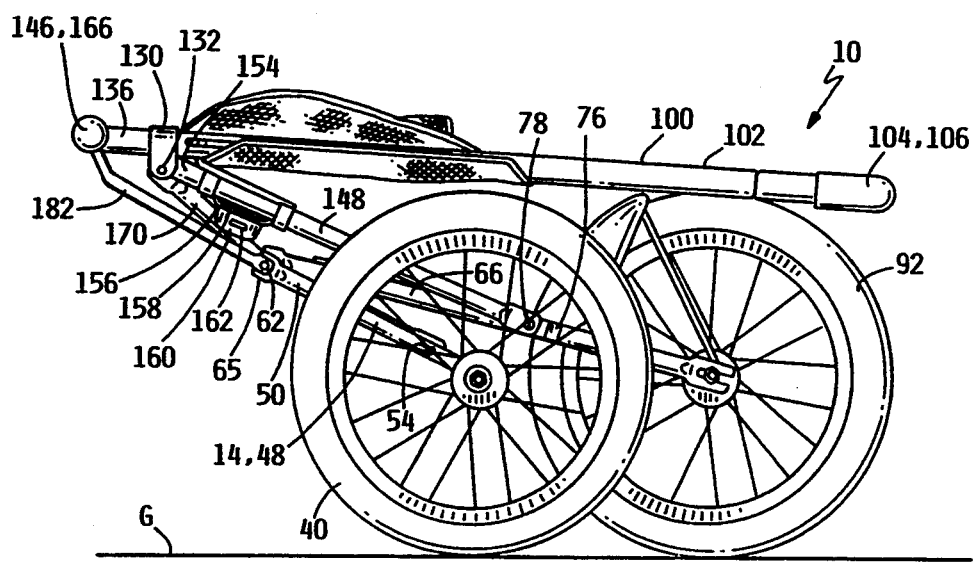
FIG. 13 is a side elevational view of the infant stroller in its fully contracted collapsed condition.

Referring to FIGS. 2 and 11-13, the erection and contractible collapse of the jogging infant stroller 10 may now be appreciated. FIG. 2 shows the stroller 10 in upright condition with the releasable locking means 166 securely holding the respective links of the upper and lower frame portions 100 and 14 in rigid arrangement. Should the user wish to collapse the stroller 10, handles 146 are pulled outwardly and moved slightly backwardly suitably assisted by the forward lifting of U-shaped handle end 104 as the arrow shows in FIG. 11. As the forward and downward movement of the U-shaped handle end 104 continues, stabilizer struts 182 pull the rear and forward links 50 and 66 of the lower frame portion 14 upwardly as to contract and fold upon each other as the arrows so indicate in FIG. 12. This movement also folds the upper and lower links 102 and 148 of the upper frame portion upon themselves to complete the collapsed condition of the stroller as shown in FIG. 13. As will be appreciated by the comparison of FIGS. 2 and 13, the collapsed stroller is of a shorter height and length than the fully erect stroller which will greatly enhance the storage and transportation of the stroller 10 within spaces previously unknown such as those in smaller automobiles.

The present invention may be embodied in other specific forms without departing from the spirit of essential attributes thereof; therefore, the illustrated embodiment should be considered in all respects as illustrative and not restrictive, reference being made to the appended claims rather than to the foregoing description to indicate the scope of the invention.

We claim:

1. A conveniently transportable, collapsible jogging infant stroller for safely and smoothly carrying an infant at walking speed and at a relatively higher speed than the normal average walking speed of approximately 3-4 miles per hour, comprising:

(a) a contractible lower frame portion having a rear end supporting two rear wheels, an intermediate portion and a front fork end supporting a front wheel, wherein the lower frame portion comprises a pair of opposing rear links extending forwardly of the rear end and each rear link forming a pivotal connection to one of a pair of opposing forward links which form the front fork end;

(b) a contractible upper frame portion having an upper handle end, an intermediate seat portion supporting a flexible infant holder and a lower end pivotally attached to the lower frame portion;

(c) two stabilizer struts pivotally extend upwardly each from the pivotal connection of one pair of the forward and the rear links to a connection with the upper frame portion wherein the stabilizer struts hold the forward and the rear links substantially horizontal to the ground and alternatively will lift the forward and the rear links to fold upon each other to contract the lower frame portion; and (d) a releasable locking means adapted to secure the stroller in an upright erect condition for use and when released to permit contraction of the upper and the lower frame portions inwardly upon themselves as to move the stroller to a collapsed and contracted condition for transportation and storage.

2. The stroller of claim 1, wherein the releasable locking means permits simultaneous contraction of the upper and lower frame portions inwardly as to collapse the stroller upon itself.

3. The stroller of claim 1, wherein the releasable locking means is connected to the stabilizer struts and the contractible upper frame portion.

4. The stroller of claim 1, wherein the stabilizer struts are each pivotally connected to the intermediate portion of the lower frame portion as to inwardly move and contract the lower frame portion into the collapsed condition when the locking means is released and the upper frame portion is contracted and collapsed.

5. The stroller of claim 1, further comprising a rear strut pivotally connected to the upper and the lower frame portions.

6. The stroller of claim 1, wherein the stroller is converted from its erect condition to its collapsed condition by releasing the locking means and moving the upper handle end forwardly and downwardly.

7. The stroller of claim 1, further comprising wing-like armrest safety fenders extending outwardly from the upper frame above and forward of the rear wheels.

8. The stroller of claim 1, wherein the upper frame portion comprises a pair of opposing upper links extending downwardly and forwardly from a handle end and each upper link being pivotally connected to one of a pair of opposing lower links which are pivotally attached to the lower frame portion.

9. The stroller of claim 8, wherein the upper links and the lower links partially overlap with each other.

10. The stroller of claim 9, wherein the releasable locking means is connected to upper ends of the stabilizer struts and secures and releases the partial overlap of one pair of the upper and the lower links.

11. The stroller of claim 10, wherein the releasable locking means is located on a lower end of one upper link and adjacent an upper end of one lower link of the upper frame portion.

12. The stroller of claim 11, wherein the releasable locking means comprises the pivotal connection between one pair of upper and lower links and a catch which secures the partial upper and lower link overlap.

13. The stroller of claim 12, wherein the catch is biased.

14. The stroller of claim 1, wherein the rear end of the lower frame portion is hollow for receipt of two press fit bushings which further each receives a threaded shaft extending from a rear wheel assembly which supports one of the rear wheels.

15. The stroller of claim 1, wherein the upper frame portion supports a rotatable awning bracket, awning frame and flexible awning.

16. A conveniently transportable, collapsible jogging infant stroller for safely and smoothly carrying an infant at walking speed and at a relatively higher speed than the normal average walking speed of approximately 3-4 miles per hour, comprising:

(a) a contractible lower frame portion having a rear end supporting two rear wheels and a pair of opposing rear links extending forwardly of the rear end and each rear link forming a pivotal connection to one of a pair of opposing forward links which form a front fork end supporting a front wheel;

(b) a contractible upper frame portion having a pair of opposing upper links extending downwardly and forwardly from a handle end and each upper link being pivotally connected to one of a pair of opposing lower links which are pivotally attached to the lower frame portion;

(c) two stabilizer struts pivotally extend upwardly each from the pivotal connection of one pair of the forward and the rear links wherein the stabilizer struts hold the forward and the rear links substantially horizontal to the ground and alternatively will lift the forward and the rear links to fold upon each other to contract the lower frame portion; and (d) a releasable locking means adapted to secure the stroller in an upright erect condition for use and when released to permit simultaneous folding of the links and contraction of the upper and lower frame portions inwardly upon themselves as to move the stroller to a collapsed and contracted condition for transportation and storage.

17. The stroller of claim 16, wherein the stabilizer struts are each pivotally connected to the pivotal connection of the lower frame portion as to inwardly move and contract the lower frame portion into the collapsed condition when the locking means is released and the upper frame portion is contracted and collapsed.

18. The stroller of claim 16, further comprising a rear strut pivotally connected to the upper and the lower frame portions.

19. The stroller of claim 16, wherein the stroller is converted from its erect condition to its collapsed condition by releasing the locking means and moving the upper handle end forwardly and downwardly.

20. The stroller of claim 16, further comprising wing-like arm rest safety fenders extending outwardly from the upper frame above and forward of the rear wheels.

21. The stroller of claim 16, wherein the upper links and the lower links partially overlap with each other.

22. The stroller of claim 21, wherein the releasable locking means is connected to upper ends of the stabilizer struts and secures and releases the partial overlap of one pair of the upper and the lower links.

23. The stroller of claim 22, wherein the releasable locking means is located on a lower end of one upper link and adjacent an upper end of one lower link of the upper frame portion.

24. The stroller of claim 23, wherein the releasable locking means comprises the pivotal connection between one pair of upper and lower links and a catch which secures the partial upper and lower link overlap.

25. The stroller of claim 24, wherein the catch is biased.

26. The stroller of claim 16, wherein the rear end of the lower frame portion is hollow for receipt of two press fit bushings which further each receives a threaded shaft extending from a rear wheel assembly which supports one of the rear wheels.

27. The stroller of claim 16, wherein the upper frame portion supports a rotatable awning bracket, awning frame and flexible awning.

28. A conveniently transportable, collapsible jogging infant stroller having a length, width and height when erect for safely and smoothly carrying an infant at walking speed and at a relatively higher speed than the normal average walking speed of approximately 3-4 miles per hour, comprising:

(a) a contractible lower frame portion having a rear end supporting two rear wheels and a front fork end supporting a front wheel wherein the lower frame portion comprises a pair of opposing rear links extending forwardly of the rear end and each rear link forming a pivotal connection to one of a pair of opposing forward links which form the front fork end;

(b) a contractible upper frame portion having an upper handle end, an intermediate seat portion supporting a flexible infant holder and a lower end pivotally attached to the lower frame portion;

(c) two stabilizer struts pivotally extend upwardly each from the pivotal connection of one pair of the forward and the rear links wherein the stabilizer struts hold the forward and the rear links substantially horizontal to the ground and alternatively will lift the forward and the rear links to fold upon each other to contract the lower frame portion; and (d) a releasable locking means adapted to secure the stroller in an upright erect condition for use and when released to permit simultaneous contraction of the upper and the lower frame portions inwardly upon themselves as to move the stroller to a collapsed and contracted condition of a shorter length and height than when erect for transportation and storage.

29. The stroller of claim 28, wherein the releasable locking means is connected to the stabilizer struts and the contractible upper frame portion.

30. The stroller of claim 28, wherein the stabilizer strut is pivotally connected to the lower frame portion as to inwardly move and contract the lower frame portion into the collapsed condition when the locking means is released and the upper frame portion is contracted and collapsed.

31. The stroller of claim 28, further comprising a rear strut pivotally connected to the upper and the lower frame portions.

32. The stroller of claim 28, wherein the stroller is converted from its erect condition to its collapsed condition by releasing the locking means and moving the upper handle end forwardly and downwardly.

33. The stroller of claim 28, wherein the upper frame portion comprises a pair of opposing upper links extending downwardly and forwardly from a handle end and each upper link being pivotally connected to one of a pair of opposing lower links which are pivotally attached to the lower frame portion.

34. The stroller of claim 33, wherein the upper links and the lower links partially overlap with each other.

35. The stroller of claim 34, wherein the releasable locking means is connected to upper ends of the stabilizer struts and secures and releases the partial overlap of one pair of the upper and the lower links.

36. The stroller of claim 35, wherein the releasable locking means is located on a lower end of one upper link and adjacent an upper end of one lower link of the upper frame portion.

37. The stroller of claim 36, wherein the releasable locking means comprises the pivotal connection between one pair of upper and lower links and a biased catch which secures the partial upper and lower link overlap.

38. A conveniently transportable, collapsible jogging infant stroller having a length and height when erect for safely and smoothly carrying an infant at walking speed and at a relatively higher speed than the normal average walking speed of approximately 3-4 miles per hour, comprising:

(a) a contractible lower frame portion having a rear end supporting two rear wheels and a pair of opposing rear links extending forwardly of the rear end and each rear link forming a pivotal connection to one of a pair of opposing forward links which form a front fork end supporting a front wheel;

(b) a contractible upper frame portion having a pair of opposing upper links extending downwardly and forwardly from a handle end, an intermediate seat portion supporting a flexible infant holder and each upper link being pivotally connected to one of a pair of opposing lower links which are pivotally attached to the lower frame portion;

(c) two stabilizer struts each pivotally connected to one of the pivotal connections of the lower frame portion and the upper frame portion wherein the stabilizer struts hold the forward and the rear links substantially horizontal to the ground and alternatively will lift the forward and the rear links to fold upon each other to contract the lower frame portion; and (d) a releasable locking means connected to upper ends of the stabilizer struts and the contractible upper frame portion adapted to secure the stroller in an upright erect condition for use and when released to permit simultaneous folding of the links and contraction of the upper and the lower frame portions inwardly upon themselves when the handle end is moved forwardly and downwardly as to move the stroller to a collapsed and contracted condition of a shorter height and length than when erect for transportation and storage of the stroller.

* * * * *